(12) United States Patent
Blackburn et al.

(10) Patent No.: US 9,747,811 B2
(45) Date of Patent: Aug. 29, 2017

(54) FLAME SIMULATOR WITH WEIGHTED BASE

(71) Applicant: Lion Apparel, Inc., Dayton, OH (US)

(72) Inventors: John Joseph Blackburn, Rensselaer, NY (US); Evan Andrew Ladd, Amsterdam, NY (US); Cary John Vaeth, Scotia, NY (US)

(73) Assignee: LION GROUP, INC., Dayton, OH (US)

( * ) Notice: Subject to any disclaimer, the term of this patent is extended or adjusted under 35 U.S.C. 154(b) by 262 days.

(21) Appl. No.: 14/487,759

(22) Filed: Sep. 16, 2014

(65) Prior Publication Data

US 2015/0079557 A1   Mar. 19, 2015

Related U.S. Application Data

(60) Provisional application No. 61/878,315, filed on Sep. 16, 2013.

(51) Int. Cl.
*G09B 9/00* (2006.01)
*A62C 99/00* (2010.01)
(Continued)

(52) U.S. Cl.
CPC ............ *G09B 9/00* (2013.01); *A62C 99/0081* (2013.01); *E04B 1/34384* (2013.01); *F21S 10/04* (2013.01); *Y10T 29/49826* (2015.01)

(58) Field of Classification Search
CPC ........ A62C 99/081; G09B 9/00; G09B 19/00; B65D 1/00
See application file for complete search history.

(56) References Cited

U.S. PATENT DOCUMENTS 2,456,479 A   12/1948   Antil
4,852,511 A   8/1989   Look et al.
(Continued)

FOREIGN PATENT DOCUMENTS

AU   2013100875   7/2013
EP   1450335   3/1998
(Continued)

OTHER PUBLICATIONS

EP, Search Report, European Application No. 14843265.1 (Mar. 20, 2017).
(Continued)

*Primary Examiner* — Timothy A Musselman
(74) *Attorney, Agent, or Firm* — Thompson Hine LLP

(57) ABSTRACT

A mounting and stabilization system including a base portion and a mounting portion pivotally coupled to the base portion. The base portion and the mounting portion have a closed configuration where the base portion and the mounting portion are generally parallel with each other and an open configuration where the base portion and the mounting portion are generally perpendicular with each other. The system further includes a collapsible container positioned between the base portion and the mounting portion, where the collapsible container is adapted to expand and receive ballast therein when the base portion and the mounting portion are in the open configuration. The collapsible container is adapted to collapse between the base portion and the mounting portion when the base portion and the mounting portion are in the closed configuration.

24 Claims, 4 Drawing Sheets

(51) Int. Cl.
 E04B 1/343 (2006.01)
 F21S 10/04 (2006.01)

(56) References Cited

U.S. PATENT DOCUMENTS

| | | | |
|---|---|---|---|
| 4,887,627 | A | 12/1989 | Audet |
| 5,248,140 | A | 9/1993 | Matherne et al. |
| 6,431,435 | B1 | 8/2002 | Jones et al. |
| 7,748,983 | B2 | 7/2010 | Blackburn et al. |
| 8,096,810 | B2 | 1/2012 | Blackburn et al. |
| 8,336,477 | B2 | 12/2012 | Walker |
| 2004/0056169 | A1 | 3/2004 | Harbaugh |
| 2005/0284718 | A1 | 12/2005 | Tai |
| 2009/0107020 | A1 | 4/2009 | Aires |
| 2009/0197229 | A1 | 8/2009 | Blackburn |
| 2009/0272139 | A1 | 11/2009 | Straface et al. |
| 2015/0204007 | A1* | 7/2015 | Lim ........................ D06F 58/14 68/5 C |

FOREIGN PATENT DOCUMENTS

| | | |
|---|---|---|
| EP | 1905486 | 4/2008 |
| WO | 2008/017836 | 2/2008 |

OTHER PUBLICATIONS

Swift Fire, "Rack and Reel Fire Hose" (Feb. 1, 2001); retrieved from the internet on Nov. 29, 2014: http://www.swiftfireprotection.com/Products/Fire_Hoses_Nozzles_Connectio/fire_hoses_nozzles_connectio.html.

"The Haagen Attach Digital Fire Training System," uploaded by Haagen Fire Training Products (May 7, 2014); retrieved from the internet on Nov. 25, 2014: http://www.youtube.com/watch?v=YGeQI5E-vJM (times 0:00 s to 1:43 s).

PCT, International Search Report and Written Opinion, PCT/US2014/055851, Dec. 30, 2014.

* cited by examiner

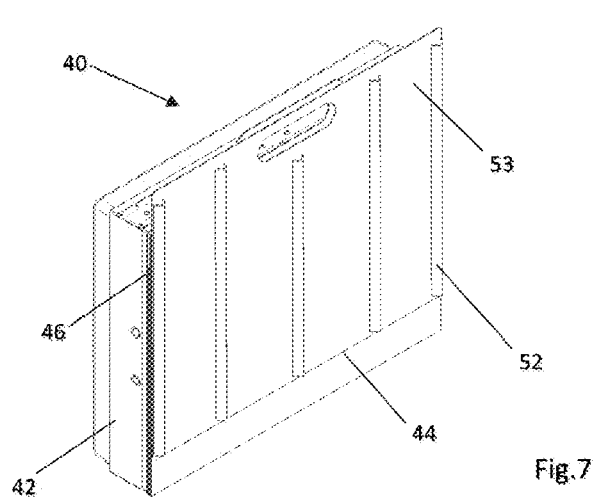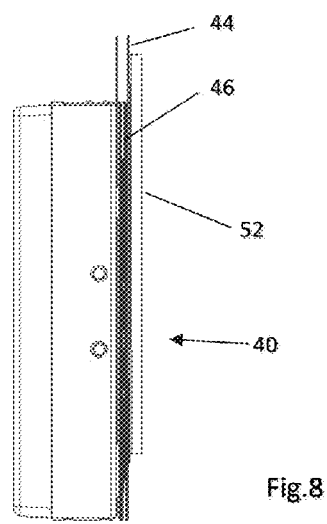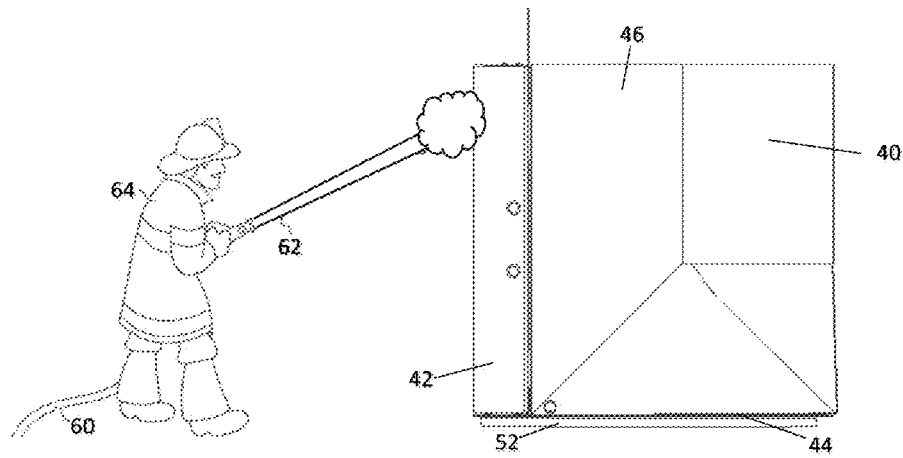

FLAME SIMULATOR WITH WEIGHTED BASE

TECHNICAL FIELD

The present application relates to portable support structures. More particularly, the present invention is in the technical field of support structures for portable firefighting training equipment.

BACKGROUND

Firefighting training exercises often involve the use of fire hoses to spray water or other extinguishants at a simulated or actual target. Fire hoses can propel water with tremendous force. For example, a two inch diameter fire hose at 100 psi can produce hundreds of pounds of force when impinging on a targeted object. This force can cause the targeted object to shift if not properly anchored. For example, where the targeted object is a display panel that presents a simulated fire, absent reinforcement, the display panel would almost certainly be unable to withstand the force of the extinguishant and consequently move in response to the force of the hose, which would negatively impact the effectiveness of the training exercise.

Conventional systems to keep a targeted object from moving involve inserting fasteners into the ground, floors or walls, or bracing the targeted object against or connecting it to a more sturdy, relatively immovable support such as a concrete barrier or dumpster. However, fasteners leave permanent holes in the floor or walls and can damage ground surfaces. Bracing the targeted object against or connecting it to other supports can damage those supports and/or the targeted subject, or subject the supports to the forces and soaking action of the impinging water. Attaching weights to the targeted object is often unfeasible because the amount of weight required to sufficiently act against the force of water is so immense that transporting the weight to the training site is burdensome and dangerous.

SUMMARY

In one aspect, a mounting and stabilization system is disclosed. The system includes a base portion and a mounting portion pivotally coupled to the base portion. The base portion and the mounting portion have a closed configuration where the base portion and the mounting portion are generally parallel with each other and an open configuration where the base portion and the mounting portion are generally perpendicular with each other. The system further includes a collapsible container positioned between the base portion and the mounting portion, where the collapsible container is adapted to expand and receive ballast therein when the base portion and the mounting portion are in the open configuration. The collapsible container is adapted to collapse between the base portion and the mounting portion when the base portion and the mounting portion are in the closed configuration.

In another aspect, a portable firefighter training device is disclosed. The device includes a display panel adapted to dynamically display an image of a hazardous condition, a sensor configured to sense an actual or simulated extinguishant targeted toward the display panel, and a support component to support the display panel. The support component includes a mounting portion that receives the display panel and a collapsible container, where the collapsible container is adapted to receive ballast therein.

In another aspect, a method of assembling a mounting and stabilization system is disclosed. The method includes providing a support component, the support component including a mounting portion to receive an item to be mounted and a collapsible container. The collapsible container is collapsed within the support component. The method further includes positioning the support component on a surface, filling the collapsible container with ballast, thereby expanding the container and increasing the weight of the support component sufficient to support the item to be mounted, and mounting the item to be mounted to the support component. The method does not further steps to anchor the support component to the surface or the surrounding environment.

Other aspects and embodiments will be apparent based on the disclosures and descriptions set forth herein.

BRIEF DESCRIPTION OF THE DRAWINGS

FIG. 7 is a rear perspective view the mounting and stabilization system of FIG. 5 in a collapsed configuration;

FIG. 8 is a side view of the mounting and stabilization system of FIG. 7; and

FIG. 9 is a side view of a user performing a training exercise with the mounting and stabilization system of FIG. 5.

DETAILED DESCRIPTION

Figure 1:
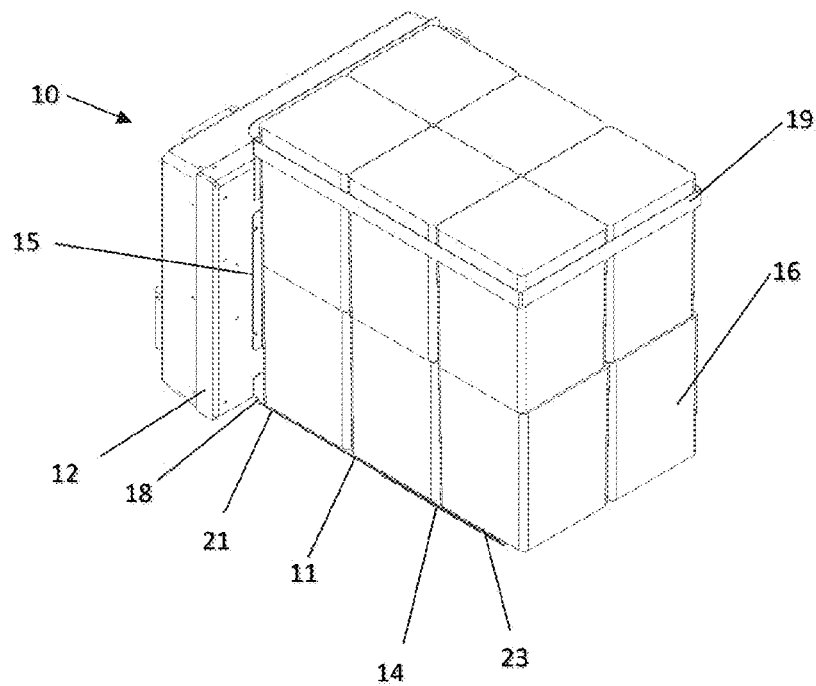
FIG. 1 is a rear perspective view of one embodiment of a mounting and stabilization system in an expanded or open configuration.

The following detailed description will illustrate the general principles of the invention, examples of which are additionally illustrated in the accompanying drawings. In the drawings, like reference numbers indicate identical or functionally similar elements.

Referring now to FIGS. 1-4, there is shown one embodiment of a mounting and stabilization system 10 supporting a display panel 12 which is removably or permanently mounted thereon. The display panel 12 may be waterproof. In one case the display panel 12 takes the form of an LED or OLED display or panel that is analogous to, or generally the same as, a LED television screen, although other technologies for the display panel 12 can be utilized, such as CRT, digital light processing, etc., so long as the display panel 12 can be made sufficiently fluid-tight (in appropriate circumstances) and are able to resist forces applied during training exercises. The display panel 12 can include a light source, display screen, and controller (such as a processor, microcomputer or the like) integrated into a single unit, with these components being positioned within or coupled to a single housing such that the display panel 12 is in one case relatively compact and manually carryable. However, the display panel 12 need not necessarily be a dynamic display of the type described above, and can also take the form of a simple board or the like which is to be targeted by the user during fire fighting training exercises. The display 12 may also include sensors or the like to track the activities of user, such as proper use of an extinguishant, although such sensors are not necessarily required. The sensors may be mounted to or integral with the display.

Figure 2:
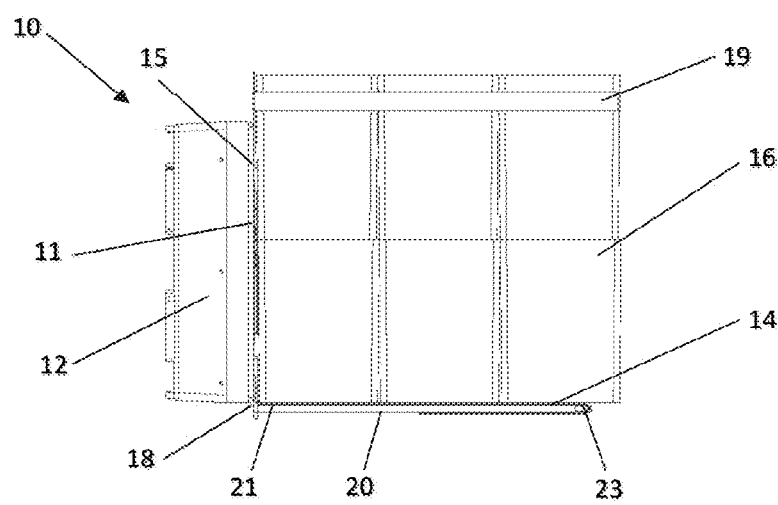
FIG. 2 is a side view of the mounting and stabilization system of FIG. 1.
Figure 3:
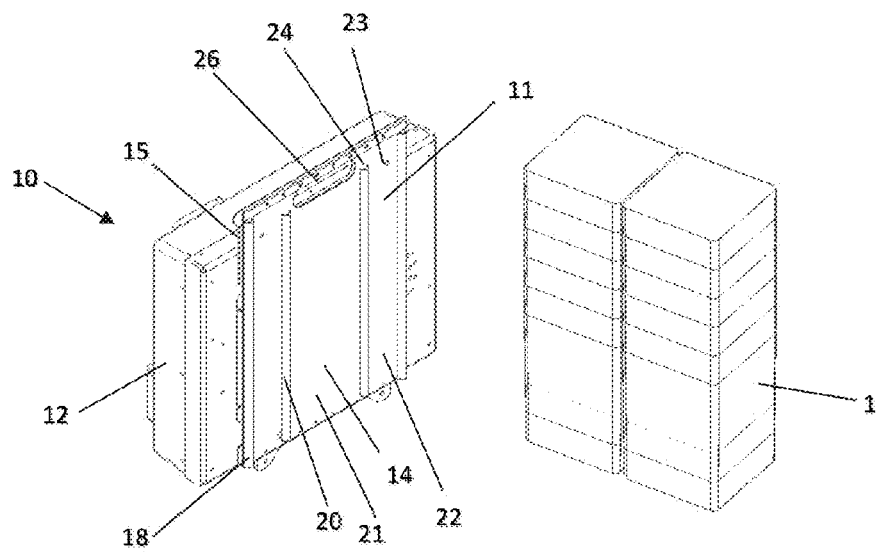
FIG. 3 is a rear perspective view the mounting and stabilization system of FIG. 1 in a collapsed configuration.
Figure 4:
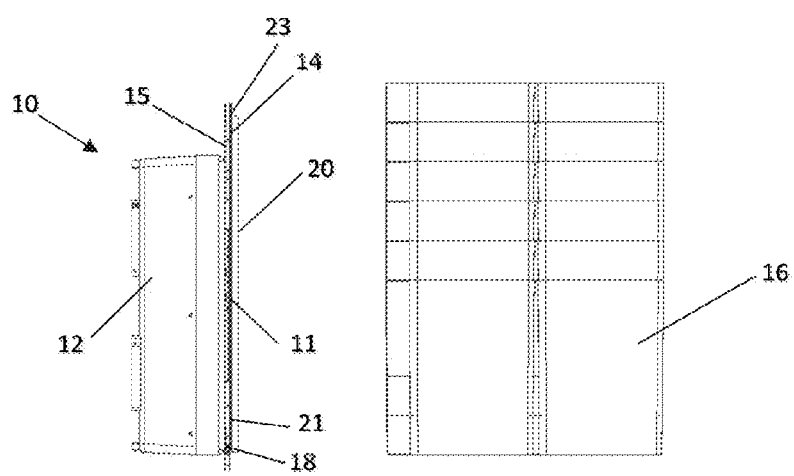
FIG. 4 is a side view of the mounting and stabilization system of FIG. 3.

The system 10 is movable between an expanded or open configuration where the system 10 is assembled and ready for use in a training exercise (FIGS. 1 and 2) and a collapsed or compact configuration in which the system 10 is more compact and more easily transported (FIGS. 3 and 4). The mounting and stabilization system 10 includes a mounting assembly 11 with a base portion or support component 14, a mounting portion 15, and a plurality of refillable containers 16 that form a container system. The mounting portion 15 may be the back of the display panel 12. The base portion 14 and the mounting portion 15 are pivotally coupled along a foldable area 18 to facilitate transition between the expanded and collapsed configurations. The base portion 14 and the mounting portion 15 may be generally flat, planar structures, and they may be generally the same size and shape in one embodiment. The mounting portion 15 is configured to receive the display panel 12 (or other mountable item) thereon, and the base portion 14 is configured to receive and support the containers 16 thereon. The base portion 14 has a front area 21 and a back area 23, and, in one embodiment, the foldable area 18 is proximate the front area 21 of the base portion 14. The top surface of the base portion 14 may include depressions or other surface features that complement the bases of the containers 16 to improve the positioning and provide ease of placement of the containers 16 on the base portion 14.

The containers 16 may be of any type that are easily stackable, nestable, and/or foldable and transportable, and the containers 16 may have lids that are storable therein. When the system 10 is in the expanded configuration, the containers 16 are filled with ballast, such as water or another fluid or solid substance to temporarily increase the weight of the system 10. The filled containers 16 are positioned on the top surface of the base portion 14, behind the mounting portion 15 and display panel 12 as shown in FIGS. 1 and 2, to thereby increase the weight of the system 10 and provide stability during a training exercise involving the spray of a pressurized stream of water at the display panel 12. The hoses to be used in the training exercise can provide a convenient water source for filling the containers 16, thereby avoiding the need to transport heavy weights or other material to fill the containers 16 (or to otherwise replace the containers 16 as a source of support weight positioned on the base portion 14).

The system 10 may include any number of containers 16, and they may be of any size and shape so long as collectively, the plurality of containers 16 fit for stable placement on the base portion 14 and are able to accommodate the requisite weight needed to prevent movement of the mounting and stabilization system 10 during the training exercise. The containers 16 need not be uniform in size. In one embodiment, the base portion 14 has a length (i.e. between the front area 21 and the back area 23) that is about twenty-four to about thirty-six inches and a width that is about twenty to about 30 inches. The containers 16, in turn, are sized to form an array that fits within these dimensions with a volume at least sufficient to contain an amount of water with the requisite weight to withstand the force of water from a hose in a training exercise. In one embodiment, the array of containers 16 may be sized to contain at least about four cubic feet of water (about 250 pounds) therein for a training exercise using a 1.75 inch diameter hand line at 125 psi. In another embodiment, the bases of the containers 16 may overhang the edges of the base portion 14 to some extent, but nonetheless be stably placed. The containers 16 may be removably positioned and arranged on the base portion 14 to ensure that the collective width and the collective height of the containers is less than the width and the height of the display panel 12 to ensure that during a training exercise, the containers 16 are substantially entirely behind the display panel 12 and thus do not create additional water spray contact surfaces that would increase the force to be resisted by the system 10 to prevent movement. In one embodiment, the display panel is from about twenty-four to about thirty-six inches wide and from about eighteen to about thirty inches high, for example about twenty-eight inches wide and about twenty-two inches high. FIGS. 1-2 illustrate an alternate embodiment in which some of the edges of the containers 16 protrude slightly beyond the edges of the display panel 12 (as shown, above the top edge).

If the containers 16 have lids (not shown), the lids can enable the containers 16 to be stackable atop each other as shown in FIGS. 1 and 2 in addition to being positioned directly on the top surface of the base portion 14. The lids may include depressions on their outer surfaces designed to interface with the bottom of the containers 16 to facilitate efficient stacking and prevent sliding of the stacked containers 16. Moreover, the containers 16 may be able to be stackable without the use of lids by placing an upper container 16 on a lip extending around the upper perimeter of another container 16 therebelow. The system 10 may further include one or more securing devices 19 to provide added stability by wrapping around the outer perimeter of at least some of the containers 16 and securing the container 16 to each other, the mounting portion 15, the base portion 14, and/or the display panel 12. The securing device 19 may be a buckled strap, a rope, a belt, a cord, or the like, and it may be flexible along its length such that when not in use, for example when the system 10 is in the collapsed configuration, the securing device 19 may fit within one of the containers 16, and/or wrap around the containers 16 and/or display panel 12.

Alternately, the securing device 19 may be permanently attached to the mounting portion 15, and the ends of the securing device 19 may be compactly spooled when not in use. In one embodiment, the system 10 may further include one or more side portions (not shown) hingedly or foldably connected to the edges and/or rear of the base portion 14 in a manner analogous to the connection between the base portion 14 and the mounting portion 15 at the foldable area 18, and such side portions may be raised and locked into position with locking features, or with the securing device 19, to further contain and support the plurality of containers 16 by acting as outer wall structures.

The base portion 14 may have a plurality of risers 20 along a bottom surface thereof that define one or more flow channels 22 therebetween (best seen in FIGS. 3-4, showing the collapsed configuration, where the bottom surface of the base portion 14 can be seen in detail). The risers 20 may extend the entire front-to-back length between the front area 21 and back area 23 of the base portion 14 or along only a portion thereof, and they may run parallel with the front-to-back length of the base portion 14 or at angles relative thereto (though risers 20 should be largely front-to-back oriented). When the mounting and stabilization system 10 is in the expanded configuration for a training exercise, the risers 20 elevate the base portion 14 off the ground, such that the flow channels 22 define a fluid pathway for liquid to flow between the ground and the base portion 14. Thus, during a training exercise, the flow channels 22 allow at least some of the water impinging near the ground flow to beneath the display panel 12 and beneath the base portion 14 through the flow channels 22. As a result, the risers 20/flow channels 22 divert at least some of the force of the high-pressure spray directed at the lower portions of the display panel that the system 10 would otherwise have to resist via the weight of the filled containers 16 in order to remain stationary. The impact of the risers 20/flow channels 22 is highly significant. It was found that without risers 20/flow channels 22 to dissipate the water pressure at the base of the display panel 12, the system 10 is far more susceptible to undesirable movement because the high pressure of the spray may lift the front edge of the system off the ground and destabilize or partially float it. In one instance, an attempt was made using eight cubic feet of water (about 500 pounds) to reinforce a system without risers 20/flow channels 22, but the system was unable to withstand the force of water from a 1.75 inch hose at 125 psi. In contrast, a system 10 that did include risers 20/flow channels 22 was able to counteract the same force with the weight of only four cubic feet of water (about 250 pounds).

The base portion 14 may include any number of risers 20, and they may be any height, for example from about 0.5 to about two inches, and in one embodiment about one inch, so long as the flow channels 22 are of sufficient size to facilitate passage of water during the training exercise without excessive pooling. The risers 20 may be have a generally hollow profile, such as a generally V, U, W, X, O, or H-shaped profile, and thus provide secondary flow channels 24 within or around the risers 20 to further direct the flow of water beneath the base portion 14 during the training exercise. The risers 20 may further include or be formed of a material with a high coefficient of friction to further increase the ability of the system 10 to resist moving in response to an applied force. Alternately, instead of risers 20, the system 10 may include a plurality of feet (not shown), for example at or near the corners of the base portion 14, which may elevate the base portion 14 off the ground by about 0.5 to about two inches, and in one embodiment about one inch, and thus provide a passageway underneath the system 10 for liquid to travel.

FIGS. 3 and 4 show the mounting and stabilization system 10 in the collapsed configuration. As depicted, the display panel 12 remains mounted to mounting portion 15, but alternately the display panel 12 may be removed from the mounting surface 15. In this configuration, the base portion 14 and the mounting portion 15 are folded along the foldable area 18 such that the base portion 14 and the mounting portion 15 are positioned generally adjacent and parallel to each other, as opposed to the orientation of these components in the expanded configuration, where they are set at an angle relative to one another (for example, generally perpendicular). If the system 10 includes side portions, these may be similarly folded flat against the base portion 14 and mounting portion 15. The base portion 14 and/or the mounting portion 15 may further include a locking feature (not shown) to secure these components together when in the collapsed configuration. One or both of the base portion 14 and the mounting portion 15 may also include a handle 26 to facilitate easy transport.

In the collapsed configuration, the containers 16 are empty. In the embodiment of FIGS. 3 and 4, the containers are nested together to form a compact stack and stacked, and lids thereof and securing device 19 may be stored within the containers 16. Alternately, the containers 16 may be disassembled or reconfigured into flat structures and stacked. For example the containers 16 may have bottom panels that pop out or can otherwise be folded upwards or downwards such that they are coplanar with one of the sides, and the joints between the sides of the containers 16 may be flexible such that once the bottom is displaced, the container 16 can be easily flattened into a generally planar form. Because the containers 16 are empty when the system 10 is in the collapsed configuration, the system 10 is relatively light weight depending on the construction materials used and can be easily transported from place to place.

The mounting and stabilization system 10 may be made from any of a wide variety of materials. The base portion 14 and mounting portion 15 may be made of welded or formed metal (such as steel or aluminum), polymers (including plastic), fiberglass, and the like, or combinations thereof, molded into a desired shape. The containers 16 may be formed of any type of flexible, semi-flexible or rigid material, such as polymers or plastic.

Figure 5:
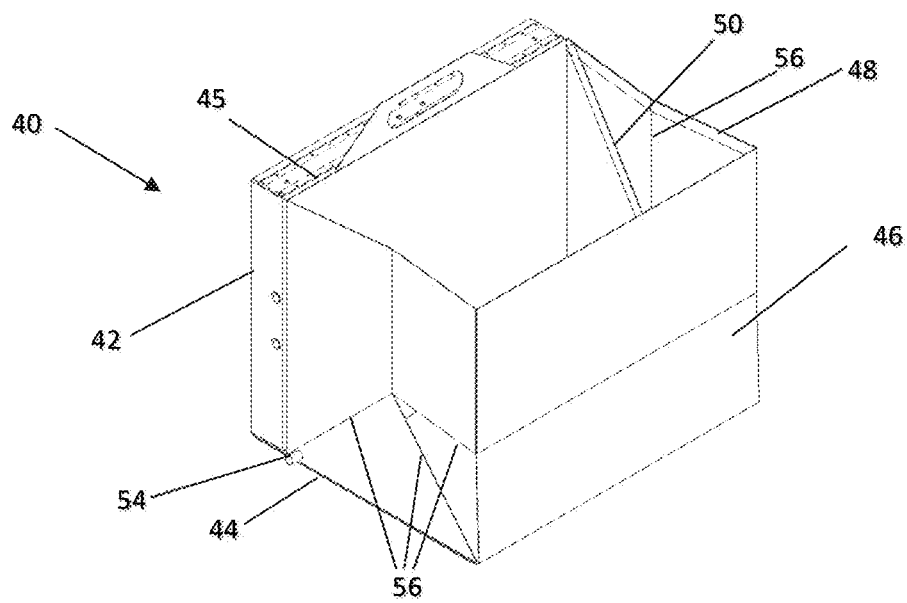
FIG. 5 is a rear perspective view of an alternate embodiment of a mounting and stabilization system in an expanded configuration.
Figure 6:
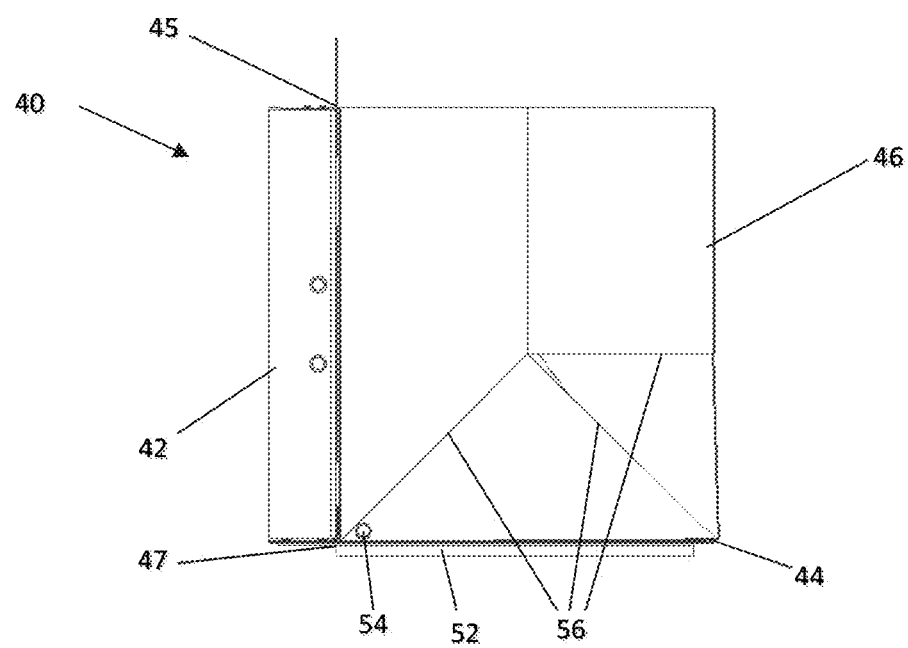
FIG. 6 is a side view of the mounting and stabilization system of FIG. 5.

FIGS. 5-8 show an alternate embodiment of the mounting and stabilization system, generally designated 40, with a display panel 42 mounted thereto. FIGS. 5 and 6 depict the system 40 in the expanded configuration, and FIGS. 7 and 8 depict the system 40 in the collapsed configuration. The mounting and stabilization system 40 includes a base portion 44, a mounting portion 45, and a collapsible, refillable container or bladder 46. The container 46 may be removably or permanently attached to either or both of the base portion 44 and the mounting portion 45. The base portion 44 and the mounting portion 45 are hingedly or foldably connected along a foldable area 47 to facilitate transition between the expanded and collapsed configurations. The base portion 44 and the mounting portion 45 may be generally flat, planar structures, and may be generally the same size and shape. One or both of the base portion 44 and the mounting portion 45 may also be a side wall or bottom of the container 46 as opposed to being a distinct component of the system 40. The mounting portion 45 is configured to receive the display panel 12 (or other mountable item) thereon, and the base portion 44 is configured to receive and support the container 46 thereon. The base portion 44 can have risers 52 along a bottom surface thereof that define one or more flow channels 53 therebetween that are analogous to the risers 20 and flow channels 22 of the first embodiment.

The collapsible container 46 serves the same function as the plurality of containers 16 of the first embodiment in that when the system 40 is in the expanded or open configuration, the container 46 is filled with water or another substance and placed on the base portion 44 and behind the mounting portion 45 and display panel 12 to temporarily increase the weight of the system 40 and provide stability during a training exercise involving the spray of a pressurized stream of water or other extinguishant at the display panel 12. The container 46 may be sized and positioned to ensure that the width and the height of the container 46 is less than the width and the height of the display panel 12, in front view, to ensure that during a training exercise, the container 46 is substantially entirely behind the display panel 12 in front view and thus does not create additional water spray contact surfaces from the forward profile/direction that would increase the force to be resisted by the system 40 during operation.

The container 46 may include a top rail 48 along one or more upper edges thereof, one or more braces 50, and/or other structures to provide added support to the walls of the container 46 when filled with water or the like. The container 46 may further include a drain valve 54, which can be located near the bottom of the container 46, to facilitate drainage of water upon the completion of the training exercise and to prepare the container 46 for the transition to the collapsed configuration for easy transport.

Referring now to the collapsed configuration (FIGS. 7 and 8) and the transition from the expanded configuration thereto, the container 46 may be collapsed in any of a variety of ways from an expanded state to a compact state. In one embodiment, as shown in FIGS. 5 and 6, the container 46 may include a plurality of fold lines or areas of weakness 56 about which the container 46 is predisposed to fold to allow the container 46 to fold in on itself when the base portion 44 is folded upward about the folding area 47 such that the base portion 44 and the mounting portion 45 are positioned nearly parallel with each other, where the collapsed container 46 is retained therebetween. Thus, when in the collapsed configuration, the bottom of the container 46 remains proximate to the base portion 44. The drain valve 54 may be pliable to allow it to fit in this same space. The top rail 48 and brace 50 may include pivotable regions that permit folding of these components along with the remainder of the container 46, or they may alternately be removed from the container 46 prior to collapse (and, if they fit, they may be inserted in the container 46).

Alternately, the container 46 may include a system of gussets or other features along the sides and or bottom thereof (not shown) to facilitate the collapse of the container 46 and system 10 by first compressing the back side of the container 46 generally linearly toward the front side of the container proximate the mounting portion 45 and then pivoting the base portion 44 toward the mounting portion as earlier described. In this collapsed configuration, the back side of the container 46 is ultimately proximate the base portion 44, not the bottom side of the container 46. Further alternately, if the container 46 is entirely removable from the base portion 44 and the mounting portion 45, the container 46 may be removed from the other components of the system 10 and folded and/or collapsed in any of a variety of ways (including those earlier described) for separate transport.

The collapsible container or bladder 46 may be of any type of flexible, semi-flexible, or rigid material that allows the container 46 to fold rather flat and fit in a small space between the base portion 44 and the mounting portion 45 when the system 10 is in the collapsed configuration.

The use of the mounting and stabilization systems 10 for a firefighting training exercise will now be described, with the understanding that system 40 may function analogously. While in the collapsed configuration, the system 10 is transported to the intended use location. Once on site, the base portion 14 and the mounting portion 15 of the mounting assembly 11 are pivoted about the folding area 18 to move the base portion 14 into position, generally parallel with the ground and generally perpendicular with the mounting portion 15. The base portion 14 rests on and is supported by the risers 20. The display panel 12, if not pre-mounted or integral with the mounting portion 15, is mounted to the mounting portion 15 such that the width of the screen is perpendicular to the orientation of the risers 20 of the base portion 14. The containers 16 are denested/assembled and are filled with water (for example, using a fire hose 60 for the training exercise) or other ballast material. The filled containers 16 are then positioned and stacked on the base portion 14 of the mounting assembly 11 behind the mounting portion 15, for example as shown in FIG. 1. The securing device 19 is wrapped around the containers 16 to further secure them to the mounting assembly 11. The display panel 12 is programmed to display flames or another simulated hazardous condition.

To complete the training exercise, as shown in FIG. 9 (which depicts use of the system 40 rather than the system 10), a trainee 64 uses the hose 60 to spray a high-powered stream of water 62 (for example about 50 to about 125 psi) or other extinguishant at the display panel 12, 42 in response to the simulated hazardous condition shown on the display panel 12, 42. The mounting assembly 11 can remain stationary through the course of the exercise by virtue of the stabilizing power of the heavy, filled containers 16 positioned on the base portion 14 (or, as shown, the stabilizing power of the filled bladder 46 on the base portion 44). Water that reaches and/or is directed to the lower portions of the display panel 12 is diverted through the flow channels 24, 53 between the risers 20, 52, as opposed to applying additional force against the mounting assembly 11.

Upon completion of the training exercise, the securing device 19 is opened and the containers 16 removed from the base portion 14, emptied of their contents, nested/disassembled as appropriate, and otherwise prepared for transport, including placing storing the lids of the containers 16 (if present) and the securing device within the containers 16. (Or, in the embodiment of system 40, the bladder 46 is emptied, for example via the drain valve 54). If appropriate, the display panel 12 is removed from the mounting portion 15. The mounting assembly 11 is transitioned back to the collapsed configuration by folding the base portion 14, 44 about the folding area 18 and generally flat against the mounting portion 15, 45. At this point, the mounting and stabilization system 10, 40 is ready for transport to another location for further use, or for compact storage.

The present invention can thus take the form of a portable, non-penetrative mounting and stabilization system for a display panel or other mountable item. The system can include a folding mounting assembly with water-pressure relief channels that separate the base from the ground surface, and the system can employ refillable, stackable/foldable container(s) that are connected to the base, resulting in a stable, secure, and portable system.

Thus, the embodiments of this invention shown in the drawings and described above are exemplary of numerous embodiments that may be made within the scope of the appended claims. It is contemplated that numerous other configurations of the mounting and stabilization system may be created taking advantage of the disclosed approach. In short, it is the applicant's intention that the scope of the patent issuing herefrom be limited only by the scope of the appended claims.

What is claimed is:

1. A mounting and stabilization system comprising:
 a base portion;
 a mounting portion pivotally coupled to the base portion, wherein the base portion and the mounting portion are movable between a closed configuration wherein the base portion and the mounting portion are generally parallel, and an open configuration wherein the base portion and the mounting portion are generally perpendicular;
 a collapsible container positionable on the base portion when the base portion and the mounting portion are in the open configuration, wherein the collapsible container is adapted to receive ballast therein, and wherein the collapsible container is adapted to be positioned between the base portion and the mounting portion when the base portion and the mounting portion are in the closed configuration; and a display panel attachable to the mounting portion and configured to dynamically display a simulated hazardous condition.

2. The mounting and stabilization system of claim 1, further comprising a sensor mounted to or integrated with the display panel or the mounting portion, wherein the sensor is configured to sense an actual or simulated extinguishant directed toward said display panel.

3. The mounting and stabilization system of claim 1, wherein the collapsible container when in an expanded configuration has a volume of at least four cubic feet.

4. The mounting and stabilization system of claim 3, wherein the system is adapted to remain stationary when positioned on a surface when the system receives 200 pounds of force applied in a direction otherwise tending to cause the system to move.

5. The mounting and stabilization system of claim 4, wherein the system lacks an anchor or support attaching the system to the surface or to the surrounding environment.

6. The mounting and stabilization system of claim 4, wherein the base portion further comprises a plurality of risers attached to a bottom thereof, the risers configured to elevate the base portion above the underlying surface to create a plurality of channels to allow fluid to flow therethrough.

7. The mounting and stabilization system of claim 1, wherein the collapsible container is permanently attached to at least one of the mounting portion and the base portion.

8. A portable firefighter training device comprising:
a display panel adapted to dynamically display an image of a hazardous condition;
a sensor configured to sense at least one of an actual or a simulated extinguishant directed toward the display panel; and
a support component adapted to support the display panel, the support component being configured to support a collapsible container thereon, wherein the collapsible container is adapted to receive ballast therein.

9. The firefighter training device of claim 8, wherein the support component includes a base portion pivotally coupled to a mounting portion which is configured to support the display panel, wherein the base portion and the mounting portion are movable between a closed configuration wherein the base portion and the mounting portion are generally parallel and an open configuration wherein the base portion and the mounting portion are generally perpendicular.

10. The firefighter training device of claim 9 further comprising the collapsible container, wherein the collapsible container is transitionable between an expanded state and a compact state, wherein when the base portion and the mounting portion are in the open configuration the collapsible container is positionable on the base portion in the expanded state, and wherein when the base portion and the mounting portion are in the closed configuration, the collapsible container is positionable between the base portion and the mounting portion in the compact state.

11. The firefighter training device of claim 10, wherein the base portion and the mounting portion are each generally flat and planar.

12. The firefighter training device of claim 9, wherein the base portion further comprises a plurality of risers attached thereto on a bottom surface thereof, the risers configured to elevate the base portion above an underlying surface to create a plurality of channels to allow fluid to flow therethrough.

13. The firefighter training device of claim 8, wherein the device is adapted to remain stationary when positioned on a surface when the device receives 200 pounds of force applied in a direction otherwise tending to cause the device to move, and wherein the device lacks an anchor or support attaching the device to the surface or the surrounding environment.

14. The firefighter training device of claim 8, wherein the collapsible container includes a drain valve adapted to facilitate drainage of ballast from the collapsible container.

15. A method of assembling a mounting and stabilization system, the method comprising:
providing a support component, the support component including a mounting portion adapted to receive an item to be mounted thereto, and providing a collapsible container in a compact state, wherein the collapsible container is transitionable between the compact state and an expanded state;
positioning the support component on a surface;
transitioning the collapsible container from the compact state to the expanded state, positioning the collapsible container on the support component and filling the collapsible container with ballast to thereby increase the weight force applied to the support component sufficiently to support the item to be mounted; and
mounting the item to be mounted to the support component wherein the method does not include further steps to anchor the support component to the surface or the surrounding environment.

16. The method of claim 15, wherein the item to be mounted is a display panel adapted to dynamically display an image of a hazardous condition.

17. The method of claim 15, wherein the support component includes a base portion pivotally coupled to the mounting portion, and wherein, during the providing step, the base portion and the mounting portion are in a closed configuration wherein the base portion and the mounting portion are generally parallel with each other and the collapsible container is sandwiched therebetween in the compact state, and wherein, during the positioning step, the base portion and the mounting portion are pivoted into an open configuration wherein the base portion and the mounting portion are generally perpendicular to each other.

18. The method of claim 15, wherein the filling step includes providing sufficient ballast in the collapsible container for the support component to remain immobile relative to the surface when the mounting portion, or the item mounted thereto, receives 200 pounds of force in a direction otherwise tending to cause the system to move.

19. A display system comprising:
a display panel adapted to dynamically display an image of a hazardous condition;
a base portion;
a mounting portion adapted to receive the display panel mounted thereto, the mounting portion being pivotally coupled to the base portion, wherein the base portion and the mounting portion are movable between a closed configuration wherein the base portion and the mounting portion are generally parallel and an open configuration wherein the base portion and the mounting portion are generally perpendicular; and
a container system, the container system including a plurality of containers adapted to receive ballast therein, wherein the plurality of containers are removably positionable on the base portion when the base portion and the mounting portion are in the open configuration to stabilize the display panel.

20. A system comprising:
a base portion including a plurality of risers attached to a bottom thereof, wherein the risers are configured to elevate a remainder of the base portion above an underlying surface when the base is positioned on the underlying surface to create at least one channel to allow fluid to flow therethrough;
a mounting portion pivotally coupled to the base portion, wherein the base portion and the mounting portion are movable between a closed configuration wherein the base portion and the mounting portion are generally parallel and an open configuration wherein the base portion and the mounting portion are generally perpendicular; and
a collapsible container positionable on the base portion when the base portion and the mounting portion are in the open configuration, wherein the collapsible container is adapted to receive ballast therein.

21. The system of claim 20 wherein the collapsible container is positionable between the base portion and the mounting portion when the base portion and the mounting portion are in the closed configuration.

22. The system of claim 20 wherein the collapsible container when in an expanded configuration has a volume of at least four cubic feet.

23. The system of claim 22 wherein the system is adapted to remain stationary when positioned on the underlying surface when the system receives 200 pounds of force applied in a direction otherwise tending to cause the system to move.

24. The system of claim 20 further comprising a display panel attachable to the mounting portion and configured to dynamically display a simulated hazardous condition.

* * * * *

UNITED STATES PATENT AND TRADEMARK OFFICE
CERTIFICATE OF CORRECTION

PATENT NO. : 9,747,811 B2  Page 1 of 1
APPLICATION NO. : 14/487759
DATED : August 29, 2017
INVENTOR(S) : Blackburn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 330 days.

Signed and Sealed this
Twenty-fifth Day of September, 2018

Andrei Iancu
*Director of the United States Patent and Trademark Office*